United States Patent
Peng et al.

(10) Patent No.: US 10,762,911 B2
(45) Date of Patent: Sep. 1, 2020

(54) AUDIO ENCODING USING VIDEO INFORMATION

(71) Applicants: Tan Peng, Richmond Hill (CA); Randall Brown, Toronto (CA); Yasser M. Khan, Seattle, WA (US); Jianfei Ye, New Market (CA)

(72) Inventors: Tan Peng, Richmond Hill (CA); Randall Brown, Toronto (CA); Yasser M. Khan, Seattle, WA (US); Jianfei Ye, New Market (CA)

(73) Assignee: ATI Technologies ULC, Markham (CA)

( * ) Notice: Subject to any disclaimer, the term of this patent is extended or adjusted under 35 U.S.C. 154(b) by 654 days.

(21) Appl. No.: 14/955,549

(22) Filed: Dec. 1, 2015

(65) Prior Publication Data
US 2017/0154634 A1    Jun. 1, 2017

(51) Int. Cl.
| | | |
|---|---|---|
| *G10L 19/22* | (2013.01) | |
| *H04N 9/82* | (2006.01) | |
| *H04N 19/87* | (2014.01) | |
| *H04N 9/804* | (2006.01) | |
| *H04N 19/103* | (2014.01) | |
| *H04N 19/142* | (2014.01) | |
| *H04N 19/179* | (2014.01) | |
| *G06K 9/00* | (2006.01) | |
| *G10L 21/055* | (2013.01) | |

(Continued)

(52) U.S. Cl.
CPC .......... *G10L 19/22* (2013.01); *G06K 9/00718* (2013.01); *G10L 21/055* (2013.01); *G11B 20/00007* (2013.01); *H04N 9/802* (2013.01); *H04N 9/8042* (2013.01); *H04N 9/8211* (2013.01); *H04N 19/103* (2014.11); *H04N 19/142* (2014.11); *H04N 19/179* (2014.11); *H04N 19/87* (2014.11); *G11B 2020/00014* (2013.01)

(58) Field of Classification Search
CPC ..... G10L 19/22; G10L 21/055; H04N 19/103; H04N 19/142; H04N 19/179; H04N 19/87; H04N 9/802; H04N 9/8042; H04N 9/8211; G06K 9/00718; G11B 20/00007
See application file for complete search history.

(56) References Cited

U.S. PATENT DOCUMENTS

| | | |
|---|---|---|
| 5,617,145 A | 4/1997 | Huang et al. |
| 8,311,120 B2 | 11/2012 | Kaushik |
| 8,780,978 B2 | 7/2014 | Polisetty et al. |

(Continued)

FOREIGN PATENT DOCUMENTS

KR    20040103158    * 12/2004    ............... H04S 3/00

OTHER PUBLICATIONS

PCT/CA2016/051220 International Search Report dated Jan. 18, 2017.

(Continued)

*Primary Examiner* — Mishawn N. Hunter
(74) *Attorney, Agent, or Firm* — Timothy M. Honeycutt

(57) ABSTRACT

Various audio encoders and methods of using the same are disclosed. In one aspect, an apparatus is provided that includes an audio encoder and an audio encoder mode selector. The audio encoder mode selector is operable to analyze video data and adjust an encoding mode of the audio encoder based on the analyzed video data.

23 Claims, 5 Drawing Sheets

(51) Int. Cl.
  *G11B 20/00* (2006.01)
  *H04N 9/802* (2006.01)

(56) References Cited

U.S. PATENT DOCUMENTS

| | | | | |
|---|---|---|---|---|
| 2008/0152310 A1* | 6/2008 | Miyagoshi | ........... | H04N 5/4401 |
| | | | | 386/328 |
| 2014/0233917 A1* | 8/2014 | Xiang | ................ | G11B 27/031 |
| | | | | 386/285 |
| 2017/0078710 A1* | 3/2017 | Rose | ................ | H04N 21/2335 |

OTHER PUBLICATIONS

DTS (sound system); http://en.wikipedia.org/wiki/DTS_(sound_system); Apr. 22, 2015; pp. 1-10.

Filter bank; http://en.wikipedia.org/wiki/Filter_bank; Apr. 2, 2015; pp. 1-15.

Christopher Davis et al.; *How audio codecs work*; http://www.eetimes.com/document.asp?doc_id=1274744; EE Times; Oct. 28, 2005; pp. 1-4.

Huffman coding; http://en.wikipedia.org/wiki/Huffman_coding; May 6, 2015; pp. 1-15.

Pulse-code modulation; http://en.wikipedia.org/wiki/Pulse-code_modulation; Jan. 29, 2015; pp. 1-11.

Quadrature mirror filter; http://en.wikipedia.org/wiki/Quadrature_mirror_filter; Mar. 7, 2013; pp. 1-3.

Spectral Audio Signal Processing; *Quadrature mirror filter*; http://www.dsprelated.com/freebooks/sasp/Quadrature_Mirro_Filters_QMF.html; May 6, 2015; pp. 1-5.

Quantization (signal processing); http://en.wikipedia.org/wiki/Quantization_(signal_processing); May 4, 2015; pp. 1-16.

Vector quantization; http://en.wikipedia.org/wiki/Vector_quantization; Feb. 21, 2015; pp. 1-7.

Yamaha Corporation; *Front Surround System YAS-103 and YAS-93 Owner's Manual*; Dec. 26, 2013; pp. 1 & 9.

* cited by examiner

AUDIO ENCODING USING VIDEO INFORMATION

BACKGROUND OF THE INVENTION

1. Field of the Invention

This invention relates generally to audio visual signal processing, and more particularly to methods and apparatus for encoding audio signals.

2. Description of the Related Art

The process of recording a motion picture with sound involves the acquisition of both video images and sound, and in the case of each type of content the acquisition involves the sampling of an otherwise continuous flow of information. For example, the video imagery is frequently sampled at a rate of twenty four frames per second. Audio is typically recorded as an analog signal that is next sampled at some bit or sampling rate to convert the analog voltage signals into digital data. The quality of the analog to digital conversion depends on a number of factors, such as the number of possible voltage levels that are represented digitally. While it might be possible to simply record or otherwise store all of the audio samples, it is typically more efficient to perform some sort of audio encoding of the sampled audio signals prior to storage on some form of media, such as a disk or hard drive.

Many current audio encoders use various techniques for compressing the sampled audio signals before sending the compressed data to a playback or storage device. Examples of these compression techniques include prediction, quantization (both vector and scalar) and Huffman coding. Many audio visual recordings involve significant variations in video and audio content over the duration of the recording. One scene might involve a boisterous action sequence with loud audio content and little dialog and the next scene might involve an intimate conversation between characters with little or no music background, and so on.

Current audio encoders encode audio signals without taking into account what may be valuable video information, such as scene changes, the presence of dialog intensive scenes. As a result, current audio encoders typically determine mode (i.e., prediction on/off), bit-rate allocation and quantization parameters without video signal assistance or side-information. Audio encoder users thus have no means of utilizing video information to improve audio encoder where it is applicable.

Yamaha Corporation markets a front surround system (a sound bar) under models YAS-103 and YAS-93. These models use a feature called "clear voice," which is intended to improve the quality of voice sounds when a user is viewing video content. When clear voice is enabled, the sound bar makes adjustments to analog audio signals just before they are sent to the speakers of the sound bar. This processing differs from audio encoding because it is performed on analog signals that have undergone digital to analog conversion.

The present invention is directed to overcoming or reducing the effects of one or more of the foregoing disadvantages.

SUMMARY OF THE INVENTION

In accordance with one aspect of the present invention, an apparatus is provided that includes an audio encoder and an audio encoder mode selector. The audio encoder mode selector is operable to analyze video data and adjust an encoding mode of the audio encoder based on the analyzed video data.

In accordance with another aspect of the present invention, a method of encoding audio data is provided that includes encoding the audio data with an audio encoder and adjusting an audio encoding mode of the audio encoder based on an analysis of video data.

In accordance with another aspect of the present invention, a method of encoding audio data is provided that includes recording video and audio to create video data and audio data with a recording device. The audio data is encoded with an audio encoder and an audio encoding mode of the audio encoder is adjusted based on an analysis of the video data.

In accordance with another aspect of the present invention, a non-transitory computer readable medium having computer readable instructions for performing a method is provided. The method includes encoding the audio data with an audio encoder and adjusting an audio encoding mode of the audio encoder based on an analysis of video data.

BRIEF DESCRIPTION OF THE DRAWINGS

The foregoing and other advantages of the invention will become apparent upon reading the following detailed description and upon reference to the drawings in which.

DETAILED DESCRIPTION OF SPECIFIC EMBODIMENTS

A mechanism for improving audio encoding efficiency and/or quality using information inferred from corresponding video data is disclosed. The video information is relayed from a video analyzer/encoder to the audio encoder. The audio encoder weighs the video information with other decision parameters and adjusts the audio encoding behavior accordingly. Examples of video information that may be used to adjust audio encoding includes scene changes and up or down ticks in the amount of human dialog in the video. Additional details will now be described.

Figure 1:
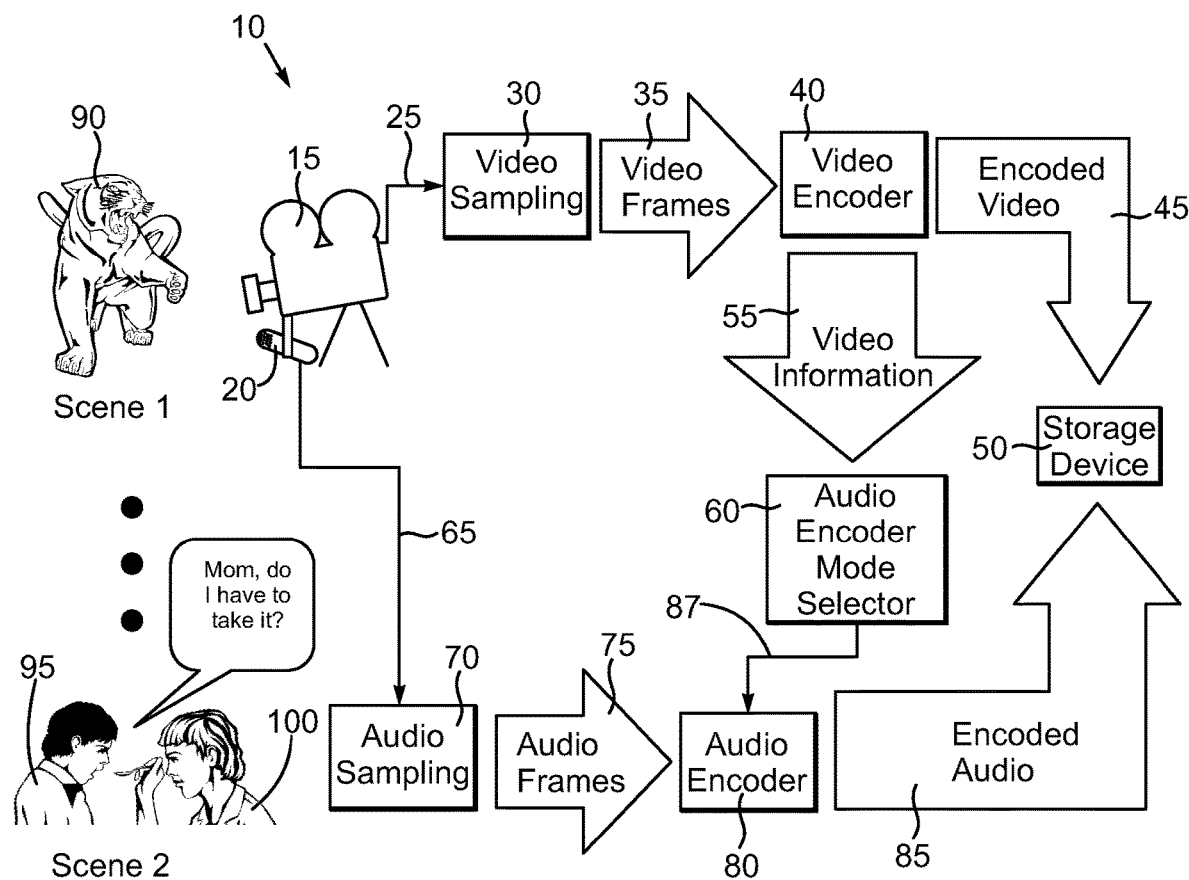
FIG. 1 is a schematic view of an exemplary audio visual system that includes controllable audio encoding stages.

In the drawings described below, reference numerals are generally repeated where identical elements appear in more than one figure. Turning now to the drawings, and in particular to FIG. 1, therein is depicted a schematic view of an exemplary audio visual (AV) system 10 that is capable of recording video and audio from multiple scenes, e.g., Scene 1, Scene 2, etc., and thereafter processing the recorded video and audio using novel encoding schemes disclosed herein. A recording device, such as a camera 15 which includes a microphone 20 may be used to record Scene 1, Scene 2, etc. The video output 25 of the camera may be delivered to a video sampling stage 30, which is operable to perform well-known sampling operations in which video data in the form of video frames 35 are output. This video sampling stage 30 may perform classical analog to digital conversion in the event that the output 25 is an analog output or may function to sample digital. The video frames 35 are delivered to a video encoder 40. The video encoder 40 may be implemented as hardware, software or combinations of the two. For example, the video encoder 40 may be in the form of instructions and data on a non-transitory computer readable medium. The video encoder 40 is operable to deliver encoded video 45 to a storage device 50 or some other location. In addition, the video encoder 40 has the capability to deliver video information 55 to an audio encoder mode select stage 60 that will be used to control the handling of the audio signals from the microphone 20 as described in more detail below.

The microphone delivers an output 65 to an audio sampling stage 70, which may function as a classic analog to digital sampler. The output of the audio sampling stage 70 consists of audio data in the form of audio frames 75 which are transmitted to an audio encoder 80. The audio encoder 80 is operable to deliver encoded audio 85 to the storage devices 50 or to some other location as desired. As will be described in conjunction with additional figures below, the audio encoder 80 is operable to receive control signals 87 from the audio encoder mode select stage 60, which, as noted above, is responsive to the video information 55 sent from the video encoder 40 in order to control the encoding of the audio frames 75 and ultimately the content of the encoded audio 85. In this way, the audio encoder 80 can tailor the encoding of the audio frames 75 based on the video information 55. For example, Scene 1 may include a nature scene such as the depicted cougar 90 and thus may include little or no dialog whereas Scene 2 may include a more dialog intensive multi-media input to the camera 15, such as the conversation between the son 95 and his mother 100. The video encoder 40 is operable to sense these scene changes and/or increases or decreases in, for example, dialog, and deliver video information 55 that represents the detection of these changes to the audio encoder mode selector 60, which then can modify the settings of the audio encoder 80 by way of the control signals 87 accordingly.

There levels of device and stage integration may take on a number of possibilities. For example, the video encoder, audio encoder mode selector 60 and audio encoder 80 may all be incorporated into the camera 15. The same is true of the video sampling stage 30 and audio sampling stages 70. In other embodiments, the video encoder 40, audio encoder mode selector 60 and audio encoder 80 may implemented in a discrete device/software. In another embodiment, the video encoder 40, the audio encoder mode selector 60 and the audio encoder 80 may be implemented as discrete devices/software. For example, the audio encoder 80 and/or the audio encoder mode selector 60 may be in the form of instructions and data on a non-transitory computer readable medium. These represent just a few examples of functional integration.

Figure 2:
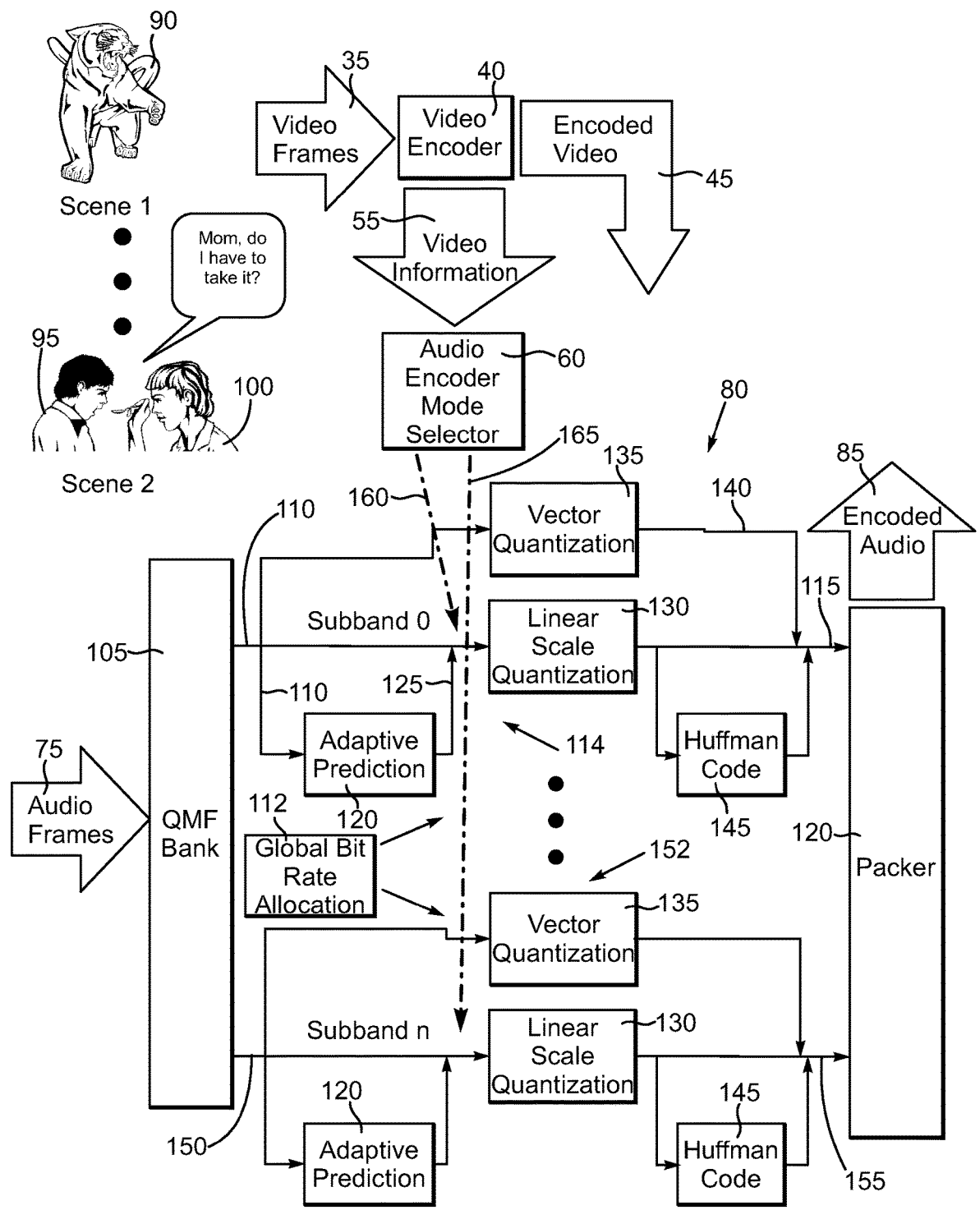
FIG. 2 is a schematic view of an exemplary audio encoder that includes an audio encoding mode select stage.

It should be understood that the audio encoder 80 may take on a great variety of implementations. FIG. 2 represents a schematic view of one type of audio encoder that tracks a well-known DTS™ encoder scheme. In this illustrative embodiment, the audio encoder 80 may include a quadrature mirror filter bank (QMF bank) 105. The QMF bank 105 may include multiple bands, two of which are shown and labeled Subband 0 and Subband n, respectively. The number n of subbands may be varied. In an exemplary embodiment, the QMF bank 105 may utilize thirty two different sub-bands and n=31. The audio frames 75 may be delivered to the QMF bank 105 using 48 kHz, 24 bit sampling or other frequency and bit lengths as desired. A global bit rate module 112 is operable to selectively set the signal processing bit rate for the subbands Subband 0 . . . Subband n. Subband 0 receives an output 110 from the QMF bank 105. Subband 0 may include a compression pipeline 114 that includes one or more of various stages to facilitate the compression of an encoded audio output 115 that is delivered to a signal packer 120. For example, Subband 0 may include an adaptive prediction module 120 that receives the output 110 of the QMF bank 105 and delivers an output 125 as an input to a linear scale quantization stage 130. Quantization in digital signal processing involves mapping a large set of input values to a (countable) smaller set—such as rounding values to some unit of precision. For example, the output of linear scale quantization stage 130 using mid-tread quantization can be expressed as:

$$Q(x) = \text{sgn}(x) \cdot \Delta \cdot \left\lfloor \frac{|x|}{\Delta} + \frac{1}{2} \right\rfloor \qquad (1)$$

where sgn(x) is the sign function (also known as the signum function) and $\Delta$ is the quantization step size. The step size A can be varied in response to the control signal 160 by, for example, decreasing or increasing the number of bits allocated to the linear quantization stage 130. In addition, the output 110 is delivered to a vector quantization stage 135. Vector quantization is a quantization technique from signal processing which allows the modeling of probability density functions by the distribution of prototype vectors. It works by dividing a large set of points (vectors), such as the sampled audio signals, into groups having approximately the same number of points closest to them. Each group is represented by its centroid point, as in k-means and some other clustering algorithms. An output 140 of the vector quantization stage 135 is tied to the output 115. Finally, a Huffman code stage 145 may be used to selectively encode the output of the linear scale quantization stage 130 to further compress the audio data to the output 115 as desired.

The adaptive prediction stage 120 works in concert with the linear scale quantization stage 130 and the vector quantization stage 135. The adaptive predication stage 120 continuously computes a prediction gain by comparing the variance of a prediction residual to that of the subband samples, i.e. the samples at the input 110. If the prediction gain is large enough, the prediction residual is quantized using mid-tread scalar quantization in the linear scale quantization stage 130 and prediction coefficients are vector quantized by the vector quantization stage 135. If, however, the computed prediction gain is not above some desired threshold, then the subband samples from input 110 are quantized by the linear scale quantization stage 130 using mid-tread scalar quantization. In this illustrative embodiment, the video information 55 is transmitted to audio encoder mode selector 60. The audio encoder mode selector 60 weighs the prediction gain and the video information 55, and based on that comparison, provides a control signal 160 to instruct the linear scale quantization stage 130 to quantize the Subband 0 samples from input 110 using mid-tread scalar quantization instead of quantizing those samples with the vector quantization stage 135.

The other subbands, such as Subband n, may similarly receive an output 150 of the QMF bank 105 and include a compression pipeline 152 that may include an adaptive prediction stage 120, a linear scale quantization stage 130, a vector quantization stage 135 and a Huffman code stage 145, or some subset of these, that are operable to deliver an output 155 to the packer 120. The packer 120 is operable to deliver the encoded audio 85 to some location as described herein. The Subband n receives a control signal 165 from the audio encoder mode selector 60 that dictates encoding mode, such adaptive prediction stage on/off, global bit rate, quantization stage parameters or others.

The audio encoder mode selector 60 is operable to deliver the control signals 160 and 165 to the subbands Subband 0 . . . Subband n. These control signals (collectively labeled 87 in FIG. 1) may control the various parameters that are used by the linear scale quantization stages 130 to encode the various Subband 0 . . . Subband n according to the video information 55 delivered from the video encoder 40 that is based on the content of the video frames 35, and, as noted above the characteristics of the various scenes, Scene 1, Scene 2, etc. Two examples will now be described.

Example #1—Using Video Scene Change Notification

During a video scene change, say from Scene 1 to Scene 2, the audio frames 75 are likely to change simultaneously, and as a result it is inefficient to use previous audio frames 75 as references. As noted in the Background section above, the mode selection of existing audio encoders is not influenced by a video scene change. In the disclosed embodiments however, the video encoder 40 supplies the video information 55 to inform audio encoder mode selector 60 of any scene change. After weighing with other parameters, the audio encoder mode selector 60 may instruct the audio encoder 80 via the control signals 160 and 165 to encode the audio frames 75 in a more efficient mode, such as not using the adaptive prediction stage 120 to perform inter frame prediction techniques (e.g. differential pulse code modulation or line spectral pairs prediction). Others parameters that may be altered by the audio encoder mode selector 60 include the audio encoder global bit rate, and/or the quantization parameters used by the linear scale quantization stage 130 and the vector quantization stage 135 to achieve better encoding efficiency and/or quality.

Example #2—Using Dialog Scene Notification

As noted in the Background section above, existing audio encoders do not use the contents of a video scene, such as the presence of human dialog to adjust the audio encoding mode. In the disclosed embodiments, however, the video encoder 40 supplies the video information 55 to inform the audio encoder mode selector 60 when dialog scenes are detected, such as in Scene 2. The audio encoder mode selector 60, after weighing the event with other decision parameters, may instruct the audio encoder 80 via the control signals 160 and 165 to encode using a higher bit-rate, and/or change filter settings (e.g., the settings of the QMF bank 105) to increase the range of speech signals rather than raise or lower the frequency of audio signals. This allows for better reconstructed audio signal quality and/or efficiency.

Figure 3:
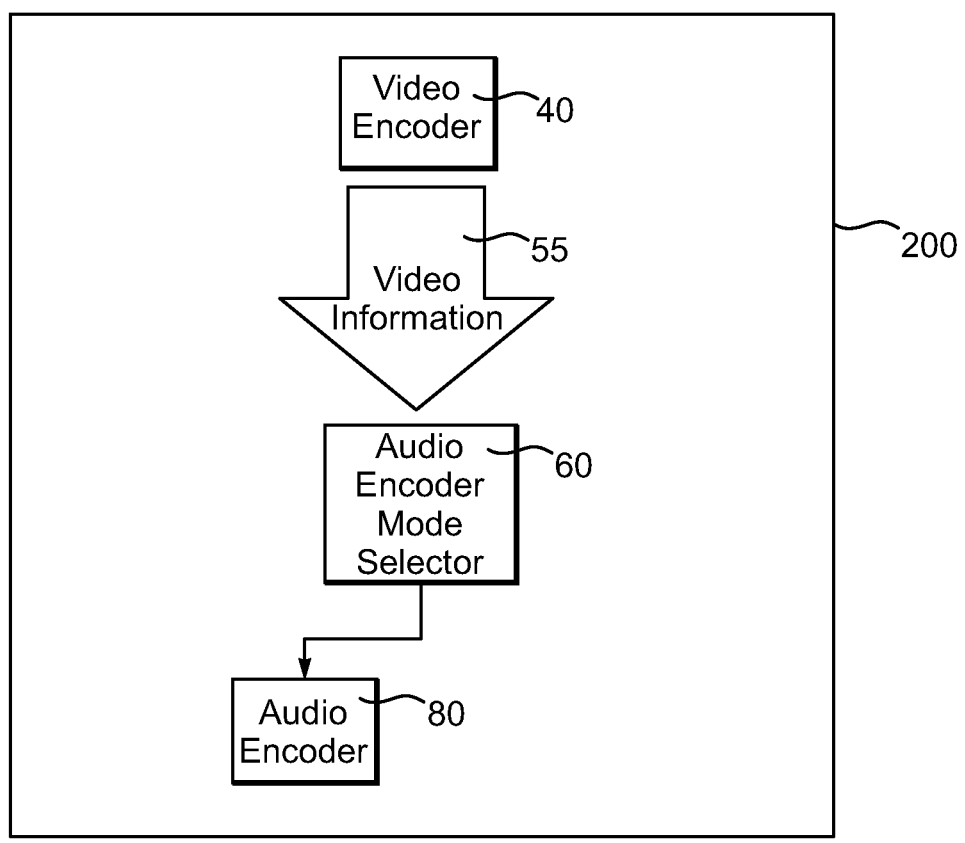
FIG. 3 is an exemplary semiconductor chip implementation of an exemplary controllable audio encoder.

As noted above, various levels of device and code integration are envisioned in accordance with the disclosed embodiments. For example, FIG. 3 depicts a schematic view of an integrated circuit 200 in the form of a semiconductor chip or otherwise on or in which the video encoder 40 operable to deliver video information 55 and the audio encoder select 60 and the audio encoder 80 may be implemented. This may be done as a discrete IC or as part of some larger digital signal processing device, such as a coder/decoder (CODEC) or other type of integrated circuit.

Figure 4:
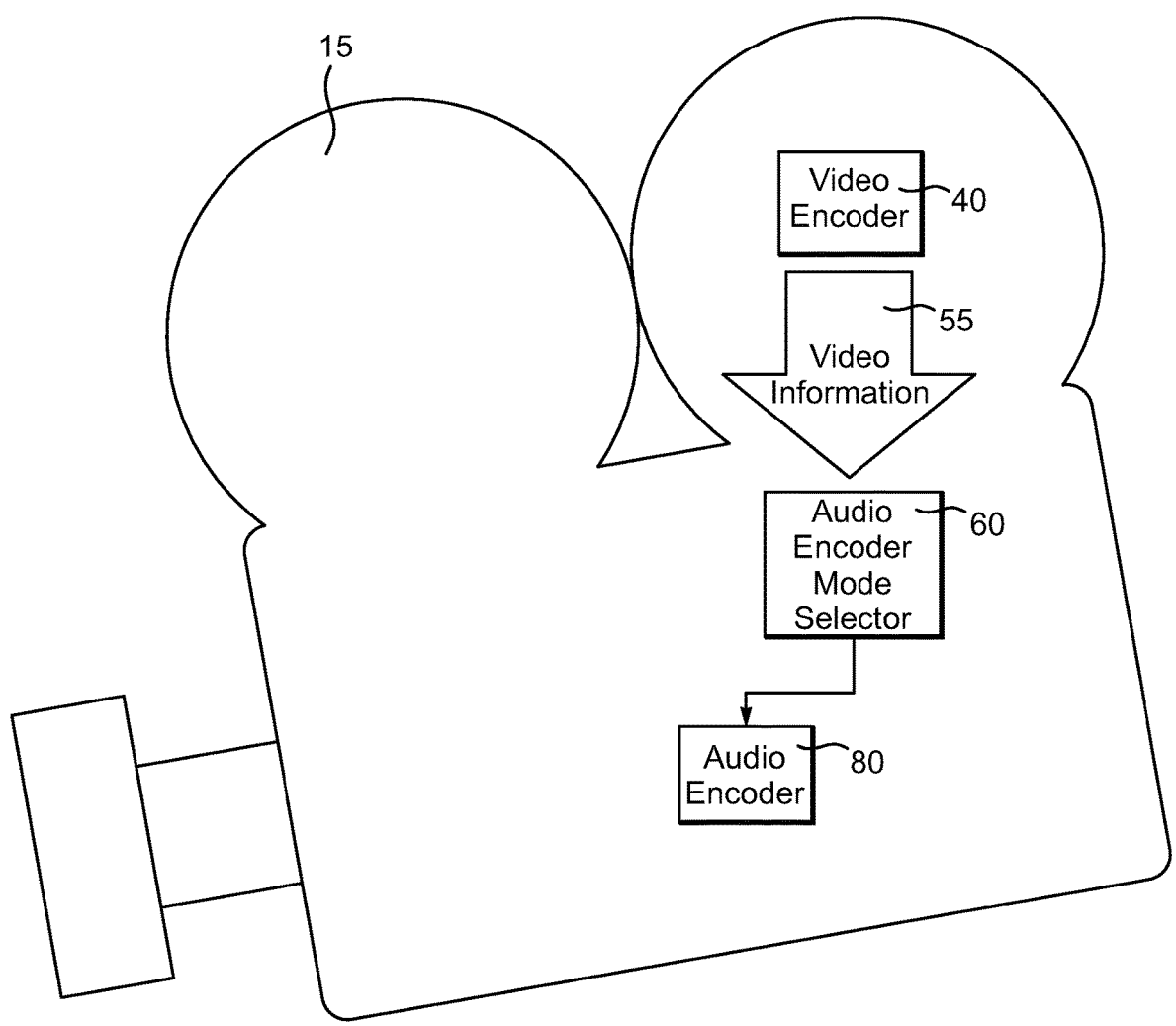
FIG. 4 is an exemplary recording device-based selective mode audio encoder.

FIG. 4 is a schematic view representing another type of device and code integration for the video information controlling audio encoder system. Here, a recording device, such as the camera 15, may include a circuit board or other substrate that incorporates the video encoder 40 operable to deliver the video information 55 to the audio encoder mode selector 60 and ultimately the audio encoder 80.

Figure 5:
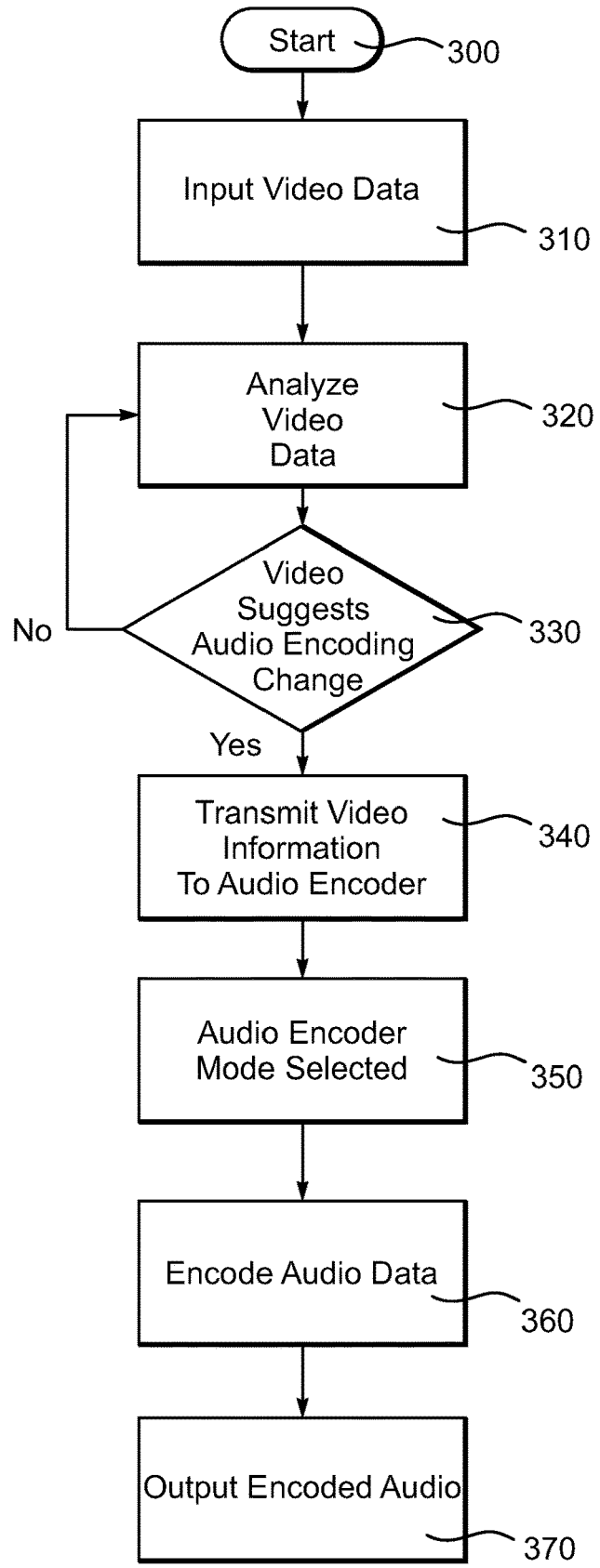
FIG. 5 is a flow chart of an exemplary audio encoding method.

FIG. 5 is an exemplary flow chart depicting an exemplary signal processing method in accordance with the disclosed embodiments. Following start at 300, video content in the form of frames or otherwise are input to the video encoder at step 310. This may involve the delivery of the video frames 35 to the video encoder 40 shown in FIG. 1. This step may coincide with the actual recording of the video frames or be done at some time after the recording process and by way of a discrete device. At step 320, the video frames are analyzed for characteristics that suggest a particular audio encoding mode. Step 320 may involve looking for scene changes, increases in a dialog or other indicia of scenes that suggest potential changes to the audio encoding scheme. If at step 330, the video encoder 40 detects conditions suggesting an audio encoding change then at step 340, the video information is transmitted to the audio encoder mode selector 60 depicted in FIG. 1. If, however, at step 330 the video encoder 40 does not detect characteristics suggesting an audio encoding change, then a return is made to step 320 to continue analyzing the video frames. If the video information is transmitted to the audio encoder at step 340 then at step 350, the audio encoder mode is selected based on the transmitted video information. Again, this may entail selecting adaptive prediction or no adaptive prediction or some other parameter associated with the data compression in the audio encoder. Next at step 360, the audio is encoded and finally at step 370, the encoded audio is outputted to, for example, the packer 120 depicted in FIG. 2.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. An apparatus, comprising:
   an audio encoder configured to encode audio data; and
   an audio encoder mode selector, the audio encoder mode selector being operable to repeatedly analyze video data associated with the audio data to look for characteristics that suggest a particular audio encoding mode and adjust the encoding mode of the audio encoder to the particular audio encoding mode based on the analyzed video data.

2. The apparatus of claim 1, wherein the audio encoder and/or the audio encoder mode selector comprises a non-transitory computer readable medium having computer readable instructions.

3. The apparatus of claim 1, comprising a semiconductor chip including the audio encoder and/or the audio encoder mode selector.

4. The apparatus of claim 1, comprising a recording device including the audio encoder and/or the audio encoder mode selector.

5. The apparatus of claim 1, wherein the audio encoder mode selector is operable to analyze the video data for scene changes or changes in human dialog.

6. The apparatus of claim 1, wherein the audio encoder comprises a data compression pipeline responsive to the encoding mode adjustment of the audio encoder mode selector.

7. The apparatus of claim 6, wherein the data compression pipeline includes a quantization stage, a prediction stage or a Huffman coding stage.

8. The apparatus of claim 1, comprising a recording device for recording video and audio, the audio encoder and the audio encoder mode selector being part of the recording device.

9. A method of encoding audio data, comprising:
recording the audio data with an audio encoder;
repeatedly analyzing video data associated with the audio data to look for characteristics that suggest a particular audio encoding mode; and
adjusting an audio encoding mode of the audio encoder to the particular audio encoding mode based on the analysis of video data associated with the audio data.

10. The method of claim 9, comprising repeatedly analyzing the video data with an audio encoder mode selector, the audio encoder mode selector being operable to analyze the video data and adjust the encoding mode of the audio encoder to the particular audio encoding mode based on the analyzed video data.

11. The method of claim 9, wherein the audio encoder and/or the audio encoder mode selector comprises a non-transitory computer readable medium having computer readable instructions.

12. The method of claim 9, wherein the audio encoder and/or the audio encoder mode selector comprise part of a semiconductor chip.

13. The method of claim 9, wherein the audio encoder and/or the audio encoder mode selector comprise part of a recording device.

14. The method of claim 9, wherein the analysis of the video data comprises recognizing scene changes or changes in human dialog.

15. The method of claim 9, wherein the audio encoder comprises a data compression pipeline responsive to the encoding mode adjustment of the audio encoder mode selector.

16. The method of claim 15, wherein the data compression pipeline includes a quantization stage, a prediction stage or a Huffman coding stage.

17. A method of encoding audio data, comprising:
recording video and audio to create video data and audio data with a recording device;
encoding the audio data with an audio encoder;
repeatedly analyzing the video data associated with the audio data to look for characteristics that suggest a particular audio encoding mode; and
adjusting an audio encoding mode of the audio encoder to the particular audio encoding mode based on the analysis of the video data.

18. The method of claim 17, comprising repeatedly analyzing the video data with an audio encoder mode selector, the audio encoder mode selector being operable to analyze the video data and adjust the encoding mode of the audio encoder to the particular audio encoding mode based on the analyzed video data.

19. The method of claim 17, wherein the audio encoder and/or the audio encoder mode selector comprises a non-transitory computer readable medium having computer readable instructions.

20. The method of claim 17, wherein the audio encoder and/or the audio encoder mode selector comprise part of a semiconductor chip.

21. The method of claim 17, wherein the audio encoder and/or the audio encoder mode selector comprise part of the recording device.

22. The method of claim 17, wherein the analysis of the video data comprises recognizing scene changes or changes in human dialog.

23. A non-transitory computer readable medium having computer readable instructions for performing a method comprising:
encoding the audio data with an audio encoder;
repeatedly analyzing video data associated with the audio data to look for characteristics that suggest a particular audio encoding mode; and
adjusting an audio encoding mode of the audio encoder to the particular audio encoding mode based on the analysis of video data associated with the audio data.

* * * * *